May 23, 1939. M. TANZMANN 2,159,299
TRIMMER FOR ASPARAGUS STALKS
Filed June 26, 1937
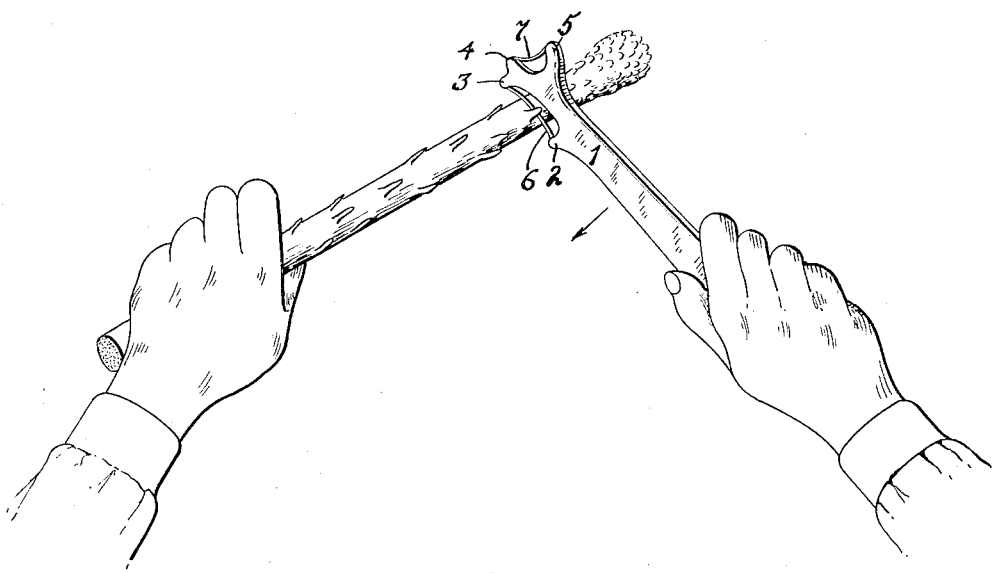
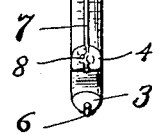
INVENTOR,
Martin Tanzmann.
BY
Andrew Wilson,
ATTORNEY.

Patented May 23, 1939

2,159,299

UNITED STATES PATENT OFFICE 2,159,299

TRIMMER FOR ASPARAGUS STALKS

Martin Tanzmann, New York, N. Y.

Application June 26, 1937, Serial No. 150,508

3 Claims. (Cl. 30—278)

The partially developed stalks of asparagus which are commonly cut and cooked for table use have, along them, the points or tips of undeveloped leaves, sheaves or sprouts, which it is desirable to remove before the asparagus is cooked.

Objects of my invention are to produce a convenient and easily manipulated tool which will quickly and efficiently remove the aforesaid tips; to produce such a tool to remove the tips without gouging into or materially injurying the stalk; to give to the tool an element of adaptability so that it will accommodate itself in degree to the rounded surface of the stalk; and to secure the other objects hereinafter pointed out.

In the drawing Fig. 1 is a plan view of a tool embodying my invention; Fig. 2 is an end view on an enlarged scale looking to the right on Fig. 1; and Fig. 3 is a perspective view on a reduced scale showing the method of applying the tool in use.

Similar reference numerals designate similar parts in all the figures.

The body 1 of the tool is shown as formed of a comparatively thin piece of metal which may be a stamping or other suitable formation, the function of this body being to afford a suitable hand grip and also points for attachment of the tip removing elements of the tool.

As shown, the tool has one or more pairs of projecting arms or extensions 2, 3 and/or 4, 5 which serve as anchorages for a slack wire and/or wires 6, 7 which are attached to and between each pair of the extensions, as by soldering 8, 8 or otherwise. The free portions of these wires are substantially longer than the distance between their points of attachment, so that the wires when attached are slack and can yield or give along their lengths so as to produce modified curves in them. The wires should be strong, not easily corroded, and as fine as is consistent with their standing up to their work.

In use the tool is grasped in one hand and the asparagus stalk in the other, as illustrated in Fig. 3. One of the wires, for instance, 6, is placed across the asparagus stalk and the tool is moved quickly down the stalk, being preferably slanted backward, as shown, and the wire being pressed against the stalk. When thus moved the wire will slide under the leaf tip down to the point where it is attached to the stalk, and will then sever it without gouging into the stalk or material stripping of its outer layer. This is materially helped by the slack condition of the wire which permits it to be bent somewhat around the stalk so that it will normally cut between the stalk and the attached edge of the tip, instead of encountering the intermediate and somewhat hard or stiff edge of the tip with the result of pushing the tip before it and tearing it off the stalk instead of neatly cutting it off, as would be the result if a taut wire or other straight edged tool were used. I find the best results are obtained with a wire which can be bent into an arc of a circle having a radius of not over approximately one and one-half inches.

In practice I have found that with my improved tool the asparagus stalk can be quickly and neatly trimmed without such defacement or injury as is usually incident to the use of available kitchen tools such as knives, scrapers or other stiff, straight-edged implements.

I wish it to be understood that the shape of the frame or body for holding the wire or wires may be varied, so long as it has the requisite amount of rigidity, furnishes the convenient hand grip, and affords a pair or pairs of projecting arms, or extensions, between which the slack wire or wires may be attached without danger of sagging back against the body of the tool.

In the drawing I have shown two separate wires, one considerably longer than the other. This is a convenient arrangement for use with different sized stalks, for the shorter wire has a much quicker curve than the longer one, and so will more readily adapt itself to the smaller stalks.

While I have spoken of using a wire or wires I wish it to be understood that fine, strong cord or the like might be substituted for the wire and tied or otherwise secured to the projections on the tool body. However, I prefer to use wire as being more durable and sanitary.

In the drawing the thickness of the wires has been somewhat exaggerated for clearness. The wire should be sufficiently small to flex easily when applied to the stalk.

Having thus described my invention what I claim and desire to secure by Letters Patent of the United States, is:

1. The method of removing a sheath tip from an asparagus stalk, consisting in severing the tip by a downward cut on a line conforming substantially to the inner transverse curvature of the tip and extending beneath it substantially from one to the other of its points of junction with the stalk.

2. The method of removing a sheath tip from an asparagus stalk, consisting in severing the tip by a downward cut on a line conforming substantially to the inner transverse curvature of the tip and extending beneath it substantially from one to the other of its points of junction with the stalk and then outwardly.

3. The method of removing a sheath tip from an asparagus stalk, consisting in severing the tip by a single downward cut on a line conforming substantially to the inner transverse curvature of the tip and extending beneath it substantially from one to the other of its points of junction with the stalk.

MARTIN TANZMANN.